J. F. SANFORD, dec'd.
J. G. SANFORD, administratrix, D. W. KISSAM, assignee.
Lamp-Burner.
No. 8,969. Reissued Nov. 18, 1879.
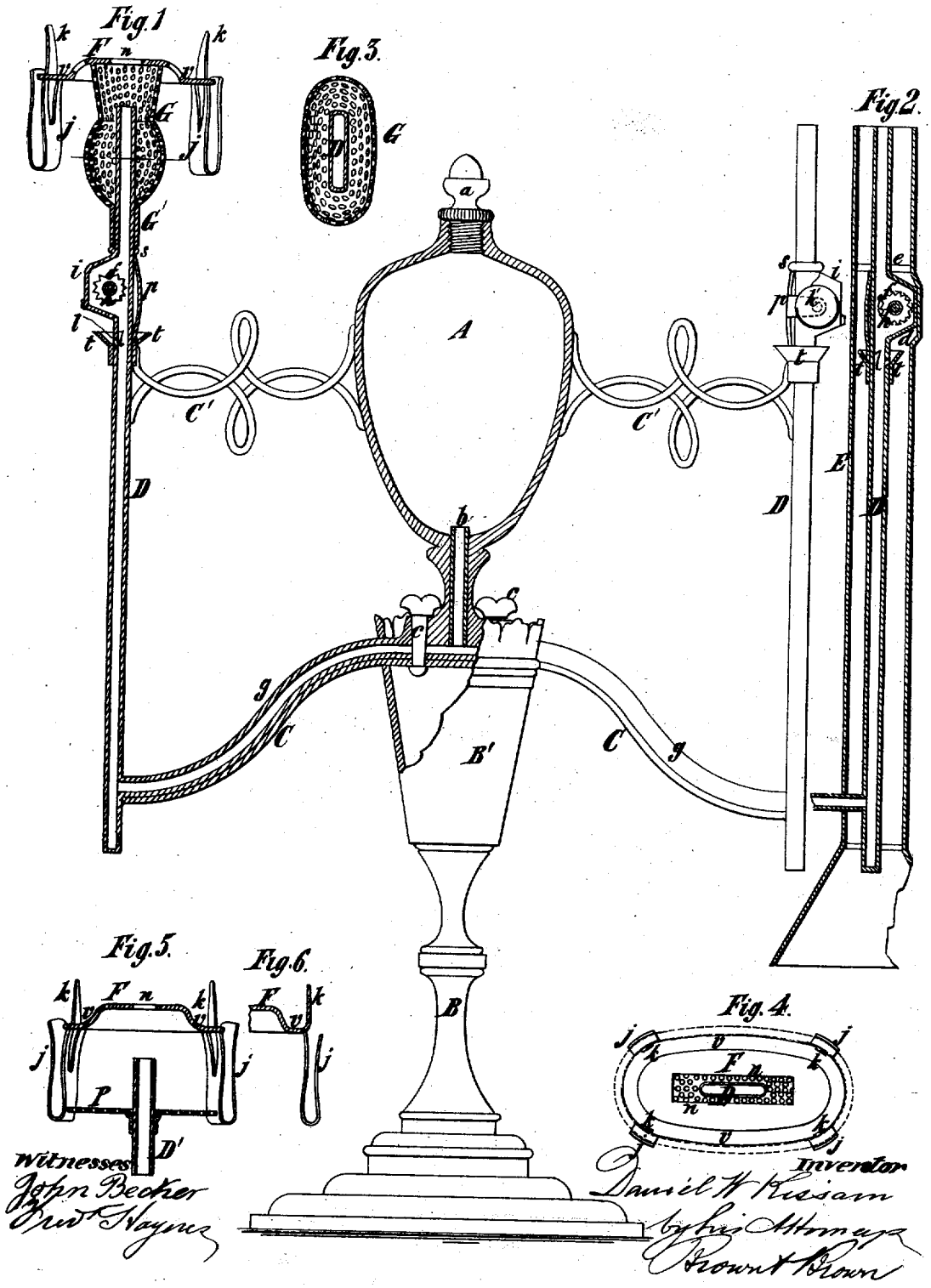
N. PETERS, PHOTO-LITHOGRAPHER, WASHINGTON, D. C.

UNITED STATES PATENT OFFICE.

DANIEL W. KISSAM, OF BRIDGEPORT, CONNECTICUT, ASSIGNEE OF JENNIE G. SANFORD, ADMINISTRATRIX OF JOHN F. SANFORD, DECEASED.

IMPROVEMENT IN LAMP-BURNERS.

Specification forming part of Letters Patent No. 86,867, dated February 9, 1869; Reissue No. 8,969, dated November 18, 1879; application filed July 31, 1879.

*To all whom it may concern:*

Be it known that JOHN F. SANFORD, of Keokuk, in the county of Lee and State of Iowa, invented new and useful Improvements in Lamps, of which the following is a full, clear, and exact description, reference being had to the accompanying drawings, making a part of this specification, in which—

Figure 1 is an elevation of a fountain-lamp, shown partly in section, and having an improved oblong burner and supply-tube applied to it. Fig. 2 is a vertical sectional view of the wick-tube of a fountain-lamp inclosed by an air-duct or chimney. Fig. 3 is a horizontal section through the air-distributer of the improved oblong burner. Fig. 4 is a plan or top view of such burner. Fig. 5 is a transverse section of a burner of modified form, and Fig. 6 is a detail section thereof.

Similar letters of reference indicate corresponding parts in the several figures.

The object of this invention is to produce a burner of greater efficiency throughout a variety of sizes than those heretofore used in respect to inducing to and deflecting upon the flame the requisite current of air.

The invention therefore consists in a lamp-burner having a cone or deflector, air-distributer, and means for holding a chimney in place, possessing certain novel characteristics, as hereinafter fully described and also claimed.

To enable others skilled in the art to understand the invention, it will be described with reference to the accompanying drawings.

In Fig. 1 of the accompanying drawings a fountain-reservoir lamp embodying the invention is represented; but it will be obvious from the following description that the invention is applicable to chandelier and bracket lamps.

A is the oil-reservoir, having a screw-cap, *a*, in its upper end for closing the filling-hole, and B B′ represent a pedestal or stand for supporting said reservoir.

Through the lower end of the reservoir A is a vertical passage, *b*, which communicates with tubes *g g*, branching off from the base of the reservoir, and communicating with two wick-tubes, D D, near the lower end thereof. The wick-tubes D D are supported in vertical planes on opposite sides of the reservoir A, and at a proper elevation, by means of arms C C and ornamental attachments C′ C′. The arms C C are of sufficient size and strength to strengthen and support the tubes *g g*, beneath which these arms lie, as shown in Fig. 1.

Near the outlet-passage *b* from the reservoir A cocks *c c* are applied to the two supply-pipes *g g*, which cocks pass through the base or foot piece of the reservoir A, and have their places thus established in such a firm manner that there will be no liability of the tubes *g* breaking at such points, nor at any point between these cocks and the discharge or outlet passage *b* from the reservoir A.

In practice, the tubes or pipes *g* and the arm-supports C C may be rigidly secured to the base of the reservoir A, so that, should a break occur, it must be at some point between the wick-tube D and the base-support B′.

The tube or tubes *g* are made just large enough to supply the necessary quantity of oil to the wick-tube D, and, should it be required to reduce this supply, the cocks *c c* are turned more or less. By thus having the supply-tubes no larger than is necessary to afford just the quantity of oil required, it is obvious that the lamp will be much safer than lamps having supply-tubes of larger diameter, inasmuch as the oil which will escape through the small tubes, would not be liable, should it take fire, to do serious injury.

The size of the bore through each tube *g* is therefore adjusted with relation to the capacity of the wick in tube D for absorbing oil, and if less light, and consequently less oil, are required, the supply is regulated by the cock or cocks *c*, as above described.

In Fig. 1 are shown two wick-tubes, D D, receiving oil from the reservoir A; but one only may be used, or more than two may be arranged around this reservoir, as may be desired.

The burner represented in Fig. 1 comprises a cone or deflector, F, of oblong or elliptical form, having a slit, *n*, and provided with a laterally-extending base or flange, *v*, which is also shown as of oblong or elliptical shape, and practically constitutes a holder for a chimney.

In combination with the base or flange *v* of this cone or deflector F are employed means for holding in place independently of said flange a chimney, (shown in dotted outline in Fig. 4,) and of corresponding oblong or elliptical shape at the base. The means for holding the chimney, as here shown, consist of stirrups *j j* depending from the said base or flange *v*. There are also fingers *k* extending upward above the base or flange *v* of the cone or deflector F, for securing the chimney in proper relation to the said base or flange, and these fingers are flexible, and hence adjustable relatively to the chimney.

The cone or deflector is internally concave and rounded, and is sustained upon and secured in a suitable manner to a perforated air distributer or box, G, which is provided with a sheath, G′, for fitting upon the wick-tube D. Said cone or deflector is in open communication with the said air-distributer, no partition being employed between the two parts in this instance.

It will be seen that, owing to the above-described method of combining the air-distributer and cone or deflector, provision is afforded for detaching the cone or deflector and chimney from the base of the burner, comprising the wick-tube and wick-adjuster.

The air-distributer G surrounds the upper portion of the wick-tube D when in place thereon, and may be made of fine wire-gauze, which will not allow flame to pass through it, or of perforated sheet metal. It will operate as a regulator for the currents of air passing through it to the flame, and so modify the force of these currents as to make a steady flame and brilliant light. Instead of making this air distributer or regulator and safety attachment in a box form, it may consist simply of a flat diaphragm, P, (see Fig. 5,) made of fine-wire gauze or of perforated sheet metal, and applied to a sheath, D′, and flanged cone F. Under this arrangement the stirrups *j j*, which depend from the edge of the flanged cone, have the diaphragm P secured to their lower ends, and the base of the elliptic chimney, resting on said stirrups *j*, will inclose the space between the flanged cone or deflector and diaphragm, and cause the air, on its way to the flame, to pass through said diaphragm.

The sheath or slide D′, like the sheath or slide G′, fits upon the upper portion of the wick-tube, and affords a means for attaching the cone or deflector, and means for holding the chimney of the burner to this tube and supporting it upon a bead or rib, *s*, upon the wick-tube.

The stirrups *j j* may be formed on the flanged cone or deflector, or made separately and afterward soldered or otherwise secured to it. The manner shown of utilizing these stirrups or chimney-supports *j* for sustaining the flanged cone or deflector F upon and securing it to the diaphragm P, as shown in Fig. 5, is equally applicable to flanged cones or deflectors which are made of a circular form for chimneys having circular bases.

This combination of a flanged cone and diaphragm forms a very open burner, which will allow the rays of light from the flame to pass downward as well as upward, and laterally beneath as well as above the said flanged cone.

In Fig. 2 is represented a wick-tube detached from its fountain or reservoir and surrounded by a tube or chimney, E, which latter may be attached to the wick-tube D by means of small pins *e*. The lower end of this external tube may extend below the lower end of the wick-tube and terminate in a flaring receiver, as shown, and the upper end of this tube E may terminate on a level with the upper end of the wick-tube, or it may be formed into a burner with all the appendages necessary.

The object of the tube or chimney E is to furnish air to the flame in such quantities as to produce perfect combustion and a brilliant light, and admit of the use of a very short chimney above the flame, and in some instances to dispense with a chimney altogether.

The tube or chimney will become heated at or near its upper end, and thus induce currents of air to rise through it very rapidly, which currents will be caused to impinge upon the flames as they issue from the upper end of the said chimney, and thus supply oxygen very freely.

The oil-supply tube *g* extends through the tube E to the wick-tube D, as shown in Fig. 2.

The wick-adjuster, consisting of a shaft, *h*, and spur-wheel *f*, is arranged in a housing, *i*, in the wick-tube, the shaft projecting through the wick-tube, as also through the tube E, and being furnished with a hand-wheel, *h′*, whereby it may be operated.

In Figs. 1 and 2 of the drawings are represented small cups *t*, applied around the wick-tubes D just below the wick-adjusting device. At the base of each cup *t*, inside, small perforations *l* are made through the wick-tube, for the purpose of conducting back into the wick-tube any oil which might run down to the outside of the tube into the cup *t*.

For fountain-lamps the cups *t* will be found very desirable to prevent oil from running down the exposed wick-tubes and dripping from their lower ends, and therefore I consider this feature of the invention valuable for such lamps. The main purpose of these cups *t* is to arrest the oil which escapes through the aperture made to allow the feed-wheel of the wick to perform its functions, and must therefore be placed below that aperture. The contrivance is not claimed broadly, but only in its connection with the particular organization herein specified.

What is claimed as new, and desired to be secured by Letters Patent, is—

1. In a lamp-burner, the combination of an internally concave and rounded cone or deflector having an oblong or elliptical base or flange and adjustable means for removably securing a chimney corresponding in shape at the bottom to the said base or flange.

2. In a lamp-burner, the combination of an air-distributer, an internally concave and rounded cone or deflector having an oblong or elliptical base or flange, and in open communication with said air-distributer, and adjustable means for removably securing a chimney corresponding in shape at the bottom to the said base or flange.

3. In a lamp-burner wherein an internally concave and rounded cone or deflector and means for holding the chimney are detachable from the base of the burner, a cone or deflector having an oblong or elliptical base or flange and adjustable means for removably securing a chimney correspondingly formed at its base.

4. In a lamp-burner, the combination of an internally concave and rounded cone or deflector having an oblong or elliptical base or flange, adjustable means for removably securing a chimney correspondingly formed at its base, a flat wick-tube, a wick-adjuster, and a perforated air-distributer.

5. A lamp-burner provided with an oblong or elliptical internally concave and rounded cone or deflector having an oblong or elliptical base or flange.

6. In a lamp-burner, the combination of an oblong or elliptical and internally concave and rounded cone or deflector provided with a laterally-extending flange and a perforated air-distributer.

7. In a lamp-burner, the combination of an internally concave and rounded cone or deflector and an oblong or elliptical holder for a chimney.

8. In a lamp-burner, the combination of an internally concave and rounded cone or deflector and an oblong or elliptical air-distributer.

9. The combination, with a lamp-burner having an oblong or elliptical and internally concave and rounded cone or deflector provided with a laterally-extending base or flange, of a chimney.

10. The combination, with a lamp-burner having an internally concave and rounded cone or deflector provided with a base or flange of oblong or elliptical form, of a chimney corresponding in shape at the bottom to the shape of said base or flange, and adjustable means for removably securing the chimney in place.

DANIEL W. KISSAM,
*Assignee of John F. Sanford.*

Witnesses:
T. J. KEANE,
E. P. JESSUP.